United States Patent [19]
Vanderplaats

[11] Patent Number: 5,497,580
[45] Date of Patent: Mar. 12, 1996

[54] COLLAPSIBLE FISHING NET APPARATUS

[76] Inventor: Garrett N. Vanderplaats, 390 Wedgewood Ct., Colorado Springs, Colo. 80906

[21] Appl. No.: 314,700

[22] Filed: Sep. 29, 1994

[51] Int. Cl.⁶ ................................................. A01K 77/00
[52] U.S. Cl. ........................................................... 43/12
[58] Field of Search ................................................ 43/12, 7

[56] References Cited

U.S. PATENT DOCUMENTS

| | | |
|---|---|---|
| 440,568 | 11/1890 | Hebard ........................................ 43/12 |
| 1,077,481 | 11/1913 | Levy ............................................ 43/12 |
| 1,490,048 | 4/1924 | Voelker ....................................... 43/12 |
| 1,524,957 | 2/1925 | Sundberg ..................................... 43/12 |
| 2,619,755 | 12/1952 | Henson ........................................ 43/12 |
| 2,738,608 | 3/1956 | Buzzini ........................................ 43/12 |
| 3,670,444 | 6/1972 | Dieterich . |
| 4,050,177 | 9/1977 | Gerritsen . |
| 4,138,790 | 2/1979 | Schmucker ................................... 43/12 |
| 4,207,700 | 6/1980 | Marleau . |
| 4,446,645 | 5/1984 | van't Veld .................................... 43/12 |
| 4,492,052 | 1/1985 | Davis . |
| 4,514,925 | 5/1985 | Rockwood . |
| 4,706,404 | 11/1987 | Kun .............................................. 43/12 |
| 4,774,783 | 10/1988 | Willard ........................................ 43/12 |

Primary Examiner—Kurt Rowan

[57] ABSTRACT

A collapsible fishing net apparatus includes a handle assembly which includes a frame-supporting hinge assembly. A frame assembly is connected to the frame-supporting hinge assembly and is supported by the handle assembly. The frame assembly includes a plurality of flexible and resilient frame members connected between adjacent flexible and resilient frame members and a plurality of manually selectable hinge lock assemblies supported by the flexible and resilient frame members. A net assembly is supported by the flexible and resilient frame members of the frame assembly. The hinge lock assemblies include rigid, hollow cylinders which have respective inner diameters greater than an outer diameter of the flexible and resilient frame members. The two of the flexible and resilient frame members which are connected to the frame-supporting hinge assembly are longer than other flexible and resilient frame members. The handle assembly may include a housing portion which defines a hollow interior chamber into which flexible and resilient frame members may be partially moved when the frame assembly is in a closed orientation and from which they may be partially moved out of when the frame assembly is in the open orientation.

1 Claim, 4 Drawing Sheets

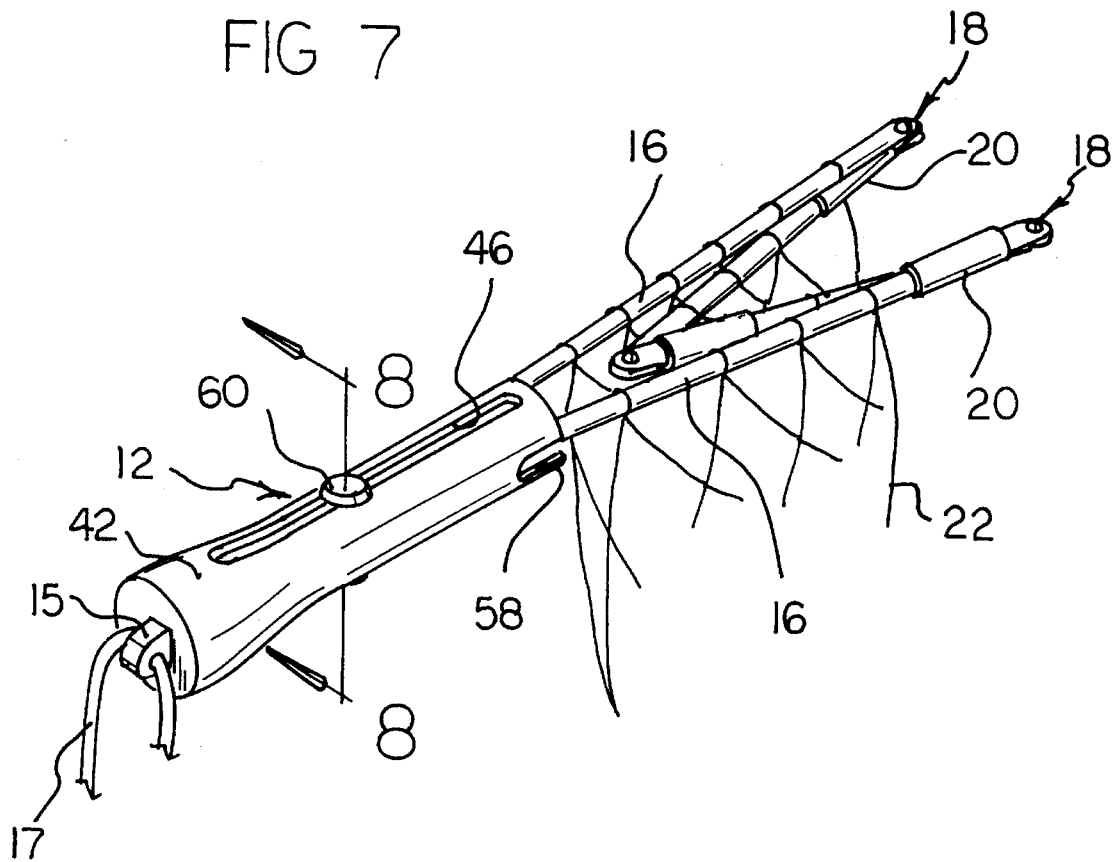
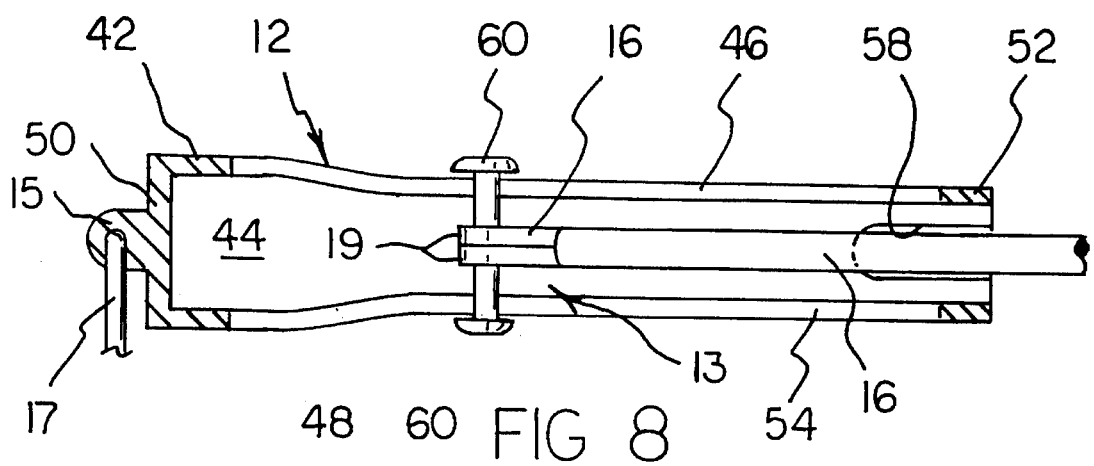

COLLAPSIBLE FISHING NET APPARATUS

BACKGROUND OF THE INVENTION

1. Field of the Invention

The present invention relates generally to nets used in fishing and, more particularly, to a hand-held fishing net that can be collapsed or folded into a compact form for transporting and storage.

2. Description of the Prior Art

Many persons participate in the sport of fishing in many shapes and forms. For example, often a backpacker carries a fishing net amongst the gear that is carried. Other fishermen carry fishing nets along with other fishing gear to a fishing spot. For many persons, the use of a portable, hand-held fishing net has a number of advantages, and throughout the years, a number of innovations have been developed relating to portable, foldable or collapsible fishing nets. The following U.S. patents are representative of some of those innovations: U.S. Pat. Nos. 3,670,444; 4,050,177; 4,207,700; 4,492,052; and 4,514,925.

More specifically, U.S. Pat. Nos. 3,670,444, 4,050,177, and 4,492,052 disclose folding fishing nets that have permanently curved or bent fishing net frame elements and hinges between adjacent frame elements. The permanent nature of the curved or bent frame members precludes very compact storage forms for the nets. Moreover, the hinges between the frame elements are unprotected and exposed to impacts and other forces which tend to damage the hinges. In these respects, it would be desirable if a collapsible fishing net were provided which includes frame elements which are not permanently curved or bent. Also, it would be desirable if hinge elements between adjacent frame members were protected from impacts and other forces tending to damage the hinges.

U.S. Pat. No. 4,207,700 discloses a triangular collapsible fishing net that employs rigid, straight frame members and flexible, unprotected hinges. Straight frame members are advantageous when the net is folded to provide a compact folded form of the net. However, one disadvantage of using rigid straight frame members is that they provide a non-round net contour. Another disadvantage is that they provide the net with acutely-angled, sharp corners which may poke, cut, or scratch a user. In this respect, it would be desirable if a collapsible fishing net were provided which has a round net contour and which avoids the use of acutely-angled, sharp corners.

U.S. Pat. No. 4,514,925 may be of interest for its disclosure of a folding net mechanism which latches the net arms in the extended position and provides a detent for the arms in the folded position.

Another disadvantage of U.S. Pat. Nos. 3,670,444, 4,492,052; and 4,514,925 discussed above is that with those nets, springs are used to maintain a net in an open position. To avoid the complexity and expense, it would be desirable to avoid the use of springs in collapsible fishing net devices.

Still other features would be desirable in a collapsible fishing net apparatus. For example, it would be desirable if the frame elements could form a naturally curved contour with the hinges therebetween protected and reinforced. In addition, to providing a very compact storage form of a collapsible fishing net, it would be desirable if a portion of the collapsible frame members could be stored in a hollow handle.

Thus, while the foregoing body of prior art indicates it to be well known to use collapsible fishing net devices, the prior art described above does not teach or suggest a collapsible fishing net apparatus which has the following combination of desirable features: (1) includes frame elements which are not permanently curved or bent; (2) provides that hinge elements between adjacent frame members are protected from impacts and other forces tending to damage the hinges; (3) has a round net contour and which avoids the use of acutely-angled, sharp corners; (4) avoids the use of springs in collapsible fishing net devices; (5) includes frame elements that can form a naturally curved contour with the hinges therebetween protected and reinforced; and (6) provides that a portion of the collapsible frame members can be stored in a hollow handle. The foregoing desired characteristics are provided by the unique collapsible fishing net apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a collapsible fishing net apparatus which includes a handle assembly which includes a frame-supporting hinge assembly. A frame assembly is connected to the frame-supporting hinge assembly and supported by the handle assembly. The frame assembly includes a plurality of flexible and resilient frame members connected between adjacent flexible and resilient frame members and a plurality of manually selectable hinge lock assemblies supported by the flexible and resilient frame members. A net assembly is supported by the flexible and resilient frame members of the frame assembly. The hinge lock assemblies includes rigid, hollow cylinders which have respective inner diameters greater than an outer diameter of the flexible and resilient frame members.

Of the flexible and resilient frame members of the frame assembly, the two of the flexible and resilient frame members which are connected to the frame-supporting hinge assembly are longer than other flexible and resilient frame members.

The handle assembly may include a housing portion which defines a hollow interior chamber. A first longitudinal slot is located on a first side of the housing portion. The frame-supporting hinge assembly includes a hinge pin adapted to be partially received in and slide in the first longitudinal slot. The hinge pin is connected to proximal ends of two of the flexible and resilient frame members, such that when the hinge pin is moved toward a distal end of the housing portion, the two proximal ends of the flexible and resilient frame members are moved distally and partially into the hollow interior chamber. Also, when the hinge pin is moved toward a proximal end of the housing portion, the two proximal ends of the flexible and resilient frame members are moved proximally, and the two flexible and resilient frame members are moved partially out from the hollow interior chamber.

The housing portion may further include a second longitudinal slot located on a second side of the housing portion which is opposite to the first side and the first longitudinal slot. The second longitudinal slot receives a portion of the hinge pin. The housing portion further includes a pair of notches located at the proximal end of the housing portion. The notches are adapted to receive the two proximal ends of the flexible and resilient frame members which are connected to the hinge pin when the frame assembly is in an open orientation. The proximal ends of the flexible and resilient frame members have apertures in which the hinge pin are received.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible fishing net apparatus which has all of the advantages of the prior art and none of the disadvantages.

It is another object of the present invention to provide a new and improved collapsible fishing net apparatus which may be easily and efficiently manufactured and marketed.

It is a further object of the present invention to provide a new and improved collapsible fishing net apparatus which is of durable and reliable construction.

An even further object of the present invention is to provide a new and improved collapsible fishing net apparatus which is susceptible of a low cost of manufacture with regard to both materials and labor, and which accordingly is then susceptible of low prices of sale to the consuming public, thereby making such collapsible fishing net apparatus available to the buying public.

Still yet a further object of the present invention is to provide a new and improved collapsible fishing net apparatus which includes frame elements which are not permanently curved or bent.

Still another object of the present invention is to provide a new and improved collapsible fishing net apparatus that provides that hinge elements between adjacent frame members are protected from impacts and other forces tending to damage the hinges.

Yet another object of the present invention is to provide a new and improved collapsible fishing net apparatus which has a round net contour and which avoids the use of acutely-angled, sharp corners.

Even another object of the present invention is to provide a new and improved collapsible fishing net apparatus that avoids the use of springs in collapsible fishing net devices.

Still a further object of the present invention is to provide a new and improved collapsible fishing net apparatus which includes frame elements that can form a naturally curved contour with the hinges therebetween protected and reinforced.

Yet another object of the present invention is to provide a new and improved collapsible fishing net apparatus that provides that a portion of the collapsible frame members can be stored in a hollow handle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 7 is a perspective view of a second embodiment of the collapsible fishing net apparatus of the invention showing a hollow handle and a mechanism for partially retracting frame members into the hollow handle.

FIG. 8 is an enlarged cross-sectional view of a portion of the handle shown in FIG. 7 taken along line 8—8 of FIG. 7.

DESCRIPTION OF THE PREFERRED EMBODIMENT

Figure 1:
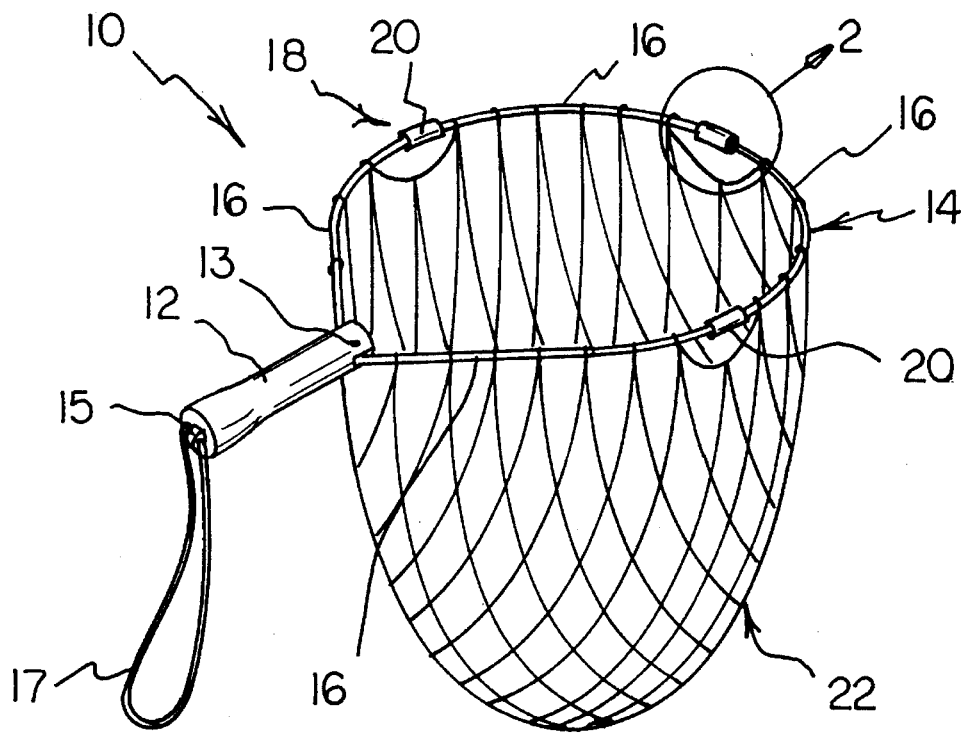
FIG. 1 is a perspective view showing a first preferred embodiment of the collapsible fishing net apparatus of the invention in a open orientation.

With reference to the drawings, a new and improved collapsible fishing net apparatus embodying the principles and concepts of the present invention will be described.

Turning to FIGS. 1–6, there is shown a first exemplary embodiment of the collapsible fishing net apparatus of the invention generally designated by reference numeral 10. In its preferred form, collapsible fishing net apparatus 10 includes a handle assembly 12 which includes a frame-supporting hinge assembly 13. A frame assembly 14 is connected to the frame-supporting hinge assembly 13 and supported by the handle assembly 12. The frame assembly 14 includes a plurality of flexible and resilient frame members 16 connected between adjacent flexible and resilient frame members 16 and a plurality of manually selectable hinge lock assemblies 20 supported by the flexible and resilient frame members 16. A net assembly 22 is supported by the flexible and resilient frame members 16 of the frame assembly 14. The hinge lock assemblies 20 includes rigid, hollow cylinders which have respective inner diameters 24 greater than an outer diameter 26 of the flexible and resilient frame members 16.

Figure 2:
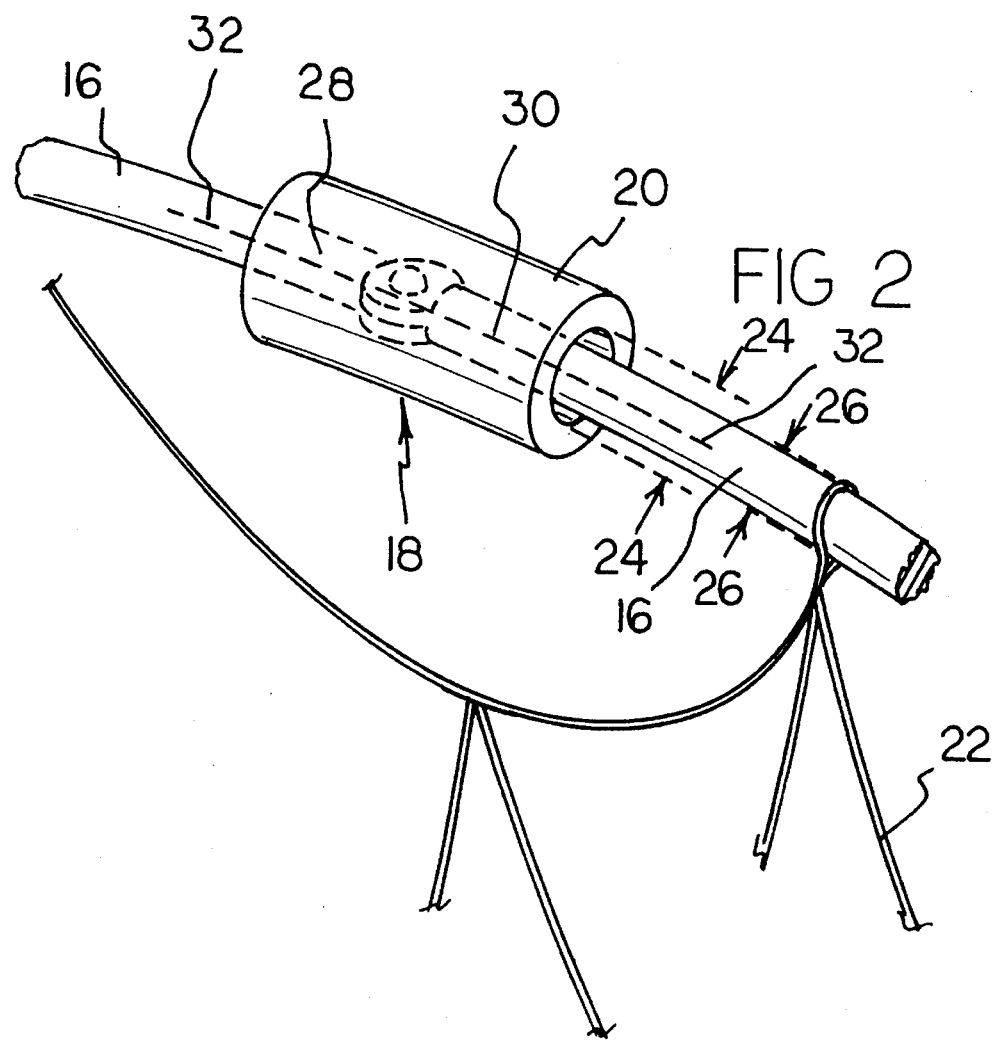
FIG. 2 is an enlarged perspective view of the portion of the embodiment of the invention shown in circled region 2 of FIG. 1 which shows a hinge protected and locked.

In FIG. 1, the collapsible fishing net apparatus 10 of the invention is shown in a open orientation. As shown in FIG. 2, each hinge lock assembly 20 is placed over a respective hinge assembly 18. In this position, each hinge lock assembly 20 straddles a hinge assembly 18 and end portions of adjacent flexible and resilient frame members 16. The rigid nature of the hinge lock assembly 20 serves to lock the encompassed hinge assembly 18 in a open position and protects the hinge assembly 18 from damage due to impacts. With the hinge lock assembly 20 in the locked position, an end 28 of one flexible and resilient frame member 16 and an end 30 of an adjacent flexible and resilient frame member 16 are maintained in longitudinal alignment that substantially coincides with a longitudinal axis 32 of the hinge lock assembly 20. In the open orientation shown in FIG. 1, although the respective end portions of the flexible and resilient frame members 16 are in substantial alignment with the respective longitudinal axes 32 of the respective hinge lock assemblies 20, the mid-portions of the flexible and resilient frame members 16 bend to a natural round orientation. In this way, the overall contour of the frame assembly 14 in the open position is a round contour. There are no acute angles between adjacent flexible and resilient frame members 16, and there are no sharp corners at the respective hinge assemblies 18 with the frame assembly 14 in the open orientation. The handle assembly 12 also includes a strap holder portion 15 and strap 17.

Figure 5:
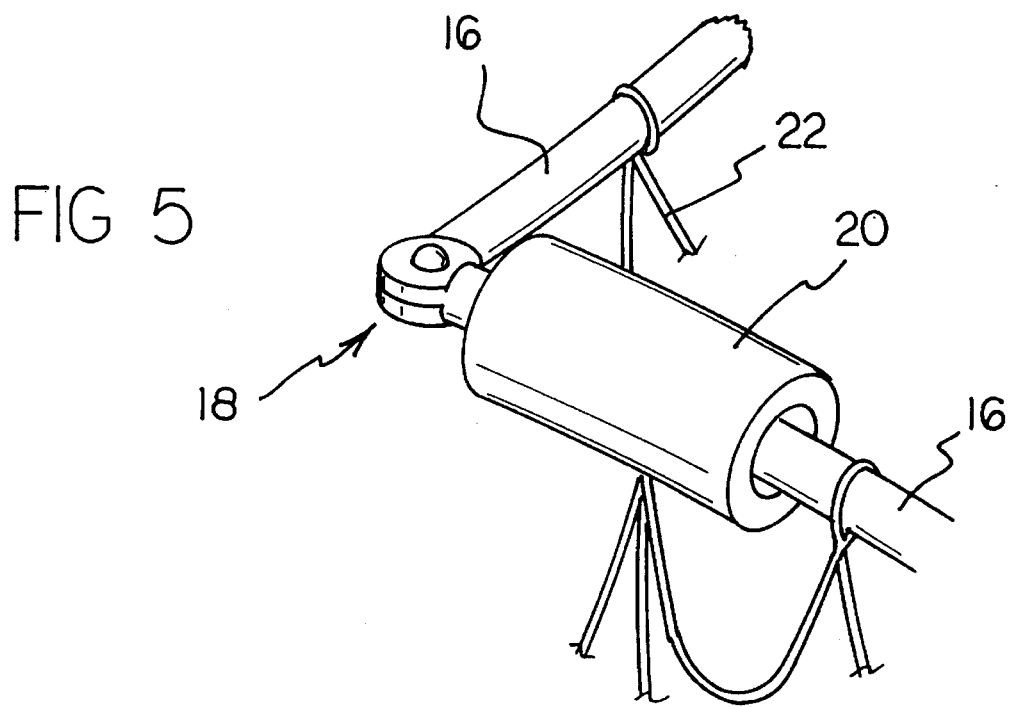
FIG. 5 is an enlarged perspective view of the portion of the embodiment of the invention shown in circled region 5 of FIG. 4 which shows a hinge unprotected and unlocked.
Figure 3:
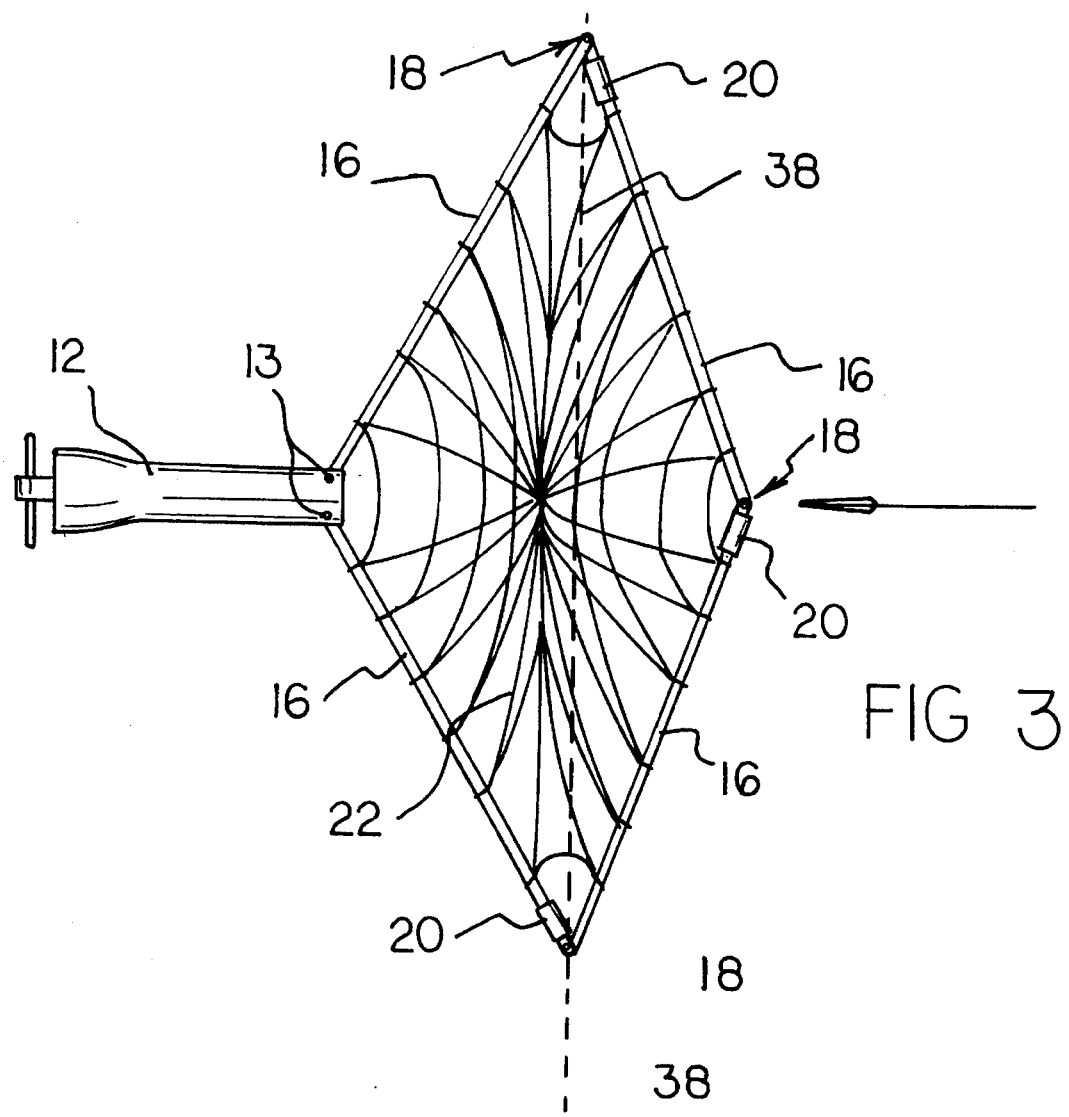
FIG. 3 is a top view of the embodiment of the invention shown in FIGURE with the hinges unlocked and the net in a state of partial collapse.

As shown in FIGS. 3 and 5, the respective hinge lock assemblies 20 have been manually slid along a flexible and resilient frame member 16 and displaced from covering a respective hinge assembly 18. As a result, the hinge assemblies 18 are permitted to move, and adjacent flexible and resilient frame members 16 are permitted to rotate with respect to each other. As the far hinge assembly 18 is pushed toward the handle assembly 12 in the direction of arrow 36 shown in FIG. 3, the frame assembly 14 is transformed from the open orientation shown in FIG. 1 to the substantially closed position shown in FIG. 4. It is noted that the far hinge assembly 18 is pushed across an imaginary line 38 between opposite hinge assemblies 18 so that the far hinge assembly 18 rests adjacent to the handle assembly 12 in the closed or collapsed orientation as shown in FIG. 4.

Figure 6:
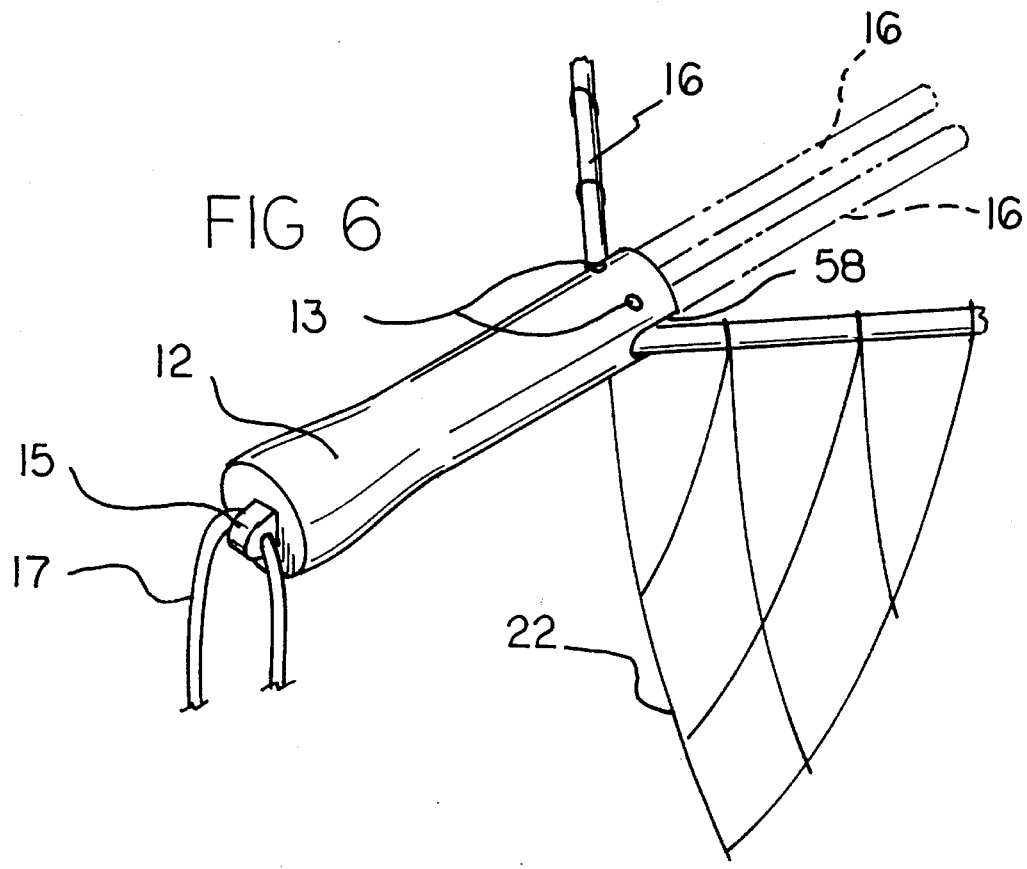
FIG. 6 is an enlarged perspective view of the handle and portions of adjacent frame members shown in FIG. 1.
Figure 4:
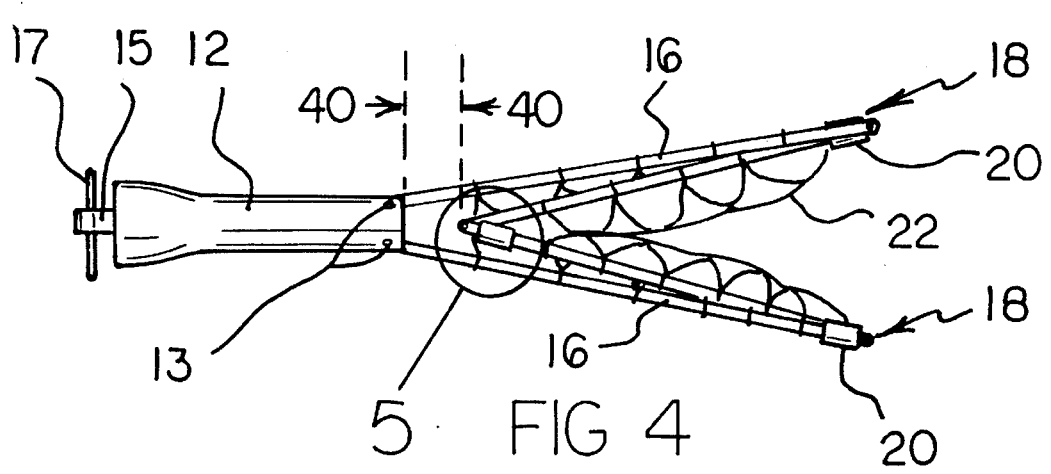
FIG. 4 is a top view of the embodiment of the invention shown in FIGURE with the net in a state of further collapse.

As shown most clearly in FIGS. 3 and 4, wherein, of the flexible and resilient frame members 16 of the frame assembly 14, two of the flexible and resilient frame members 16 which are connected to the frame-supporting hinge assembly 13 are longer than other flexible and resilient frame members 16. As a consequence, when the frame assembly 14 is in the folded orientation as shown in FIG. 4, there is a clearance 40 between the far hinge assembly 18 and the handle assembly 12. As shown in FIG. 6, in solid lines, the flexible and resilient frame members 16 are shown in an open orientation. In broken lines, the flexible and resilient frame members 16 are shown in their closed orientation.

Turning to FIGS. 7–8, a second embodiment of the invention is shown. Reference numerals are shown that correspond to like reference numerals that designate like elements shown in the other figures. In addition, the handle assembly 12 includes a housing portion 42 which defines a hollow interior chamber 44. A first longitudinal slot 46 is located on a first side of the housing portion 42. The frame-supporting hinge assembly 13 includes a hinge pin 48 adapted to be partially received in and slide in the first longitudinal slot 46. The hinge pin 48 is connected to proximal ends 19 of two of the flexible and resilient frame members 16, such that when the hinge pin 48 is moved toward a distal end 50 of the housing portion 42, the two proximal ends 19 of the flexible and resilient frame members 16 are moved distally and partially into the hollow interior chamber 44. Also, when the hinge pin 48 is moved toward a proximal end 52 of the housing portion 42, the two proximal ends 19 of the flexible and resilient frame members 16 are moved proximally, and the two flexible and resilient frame members 16 are moved partially out from the hollow interior chamber 44.

The housing portion 42 further includes a second longitudinal slot 54 located on a second side of the housing portion 42 which is opposite to the first side and the first longitudinal slot 46. The second longitudinal slot 54 receives a portion of the hinge pin 48. The hinge pin 48 includes cap portions 60 at each end of the hinge pin 48 for preventing the hinge pin 48 from sliding outside of the respective first longitudinal slot 46 and second longitudinal slot 54. The housing portion 42 further includes a pair of notches 58 located at the proximal end 52 of the housing portion 42. The notches 58 are adapted to receive the two proximal ends 19 of the flexible and resilient frame members 16 which are connected to the hinge pin 48 when the frame assembly 14 is in an open orientation. The proximal ends 19 of the flexible and resilient frame members 16 have apertures in which the hinge pin 48 are received.

In use, when the hinge pin 48 is moved toward the distal end 50 of the housing portion 42, the two longest flexible and resilient frame members 16 are squeezed together by the interior walls of the housing portion 42. This action keeps the collapsible fishing net apparatus 10 of the invention in a folded orientation as shown in FIG. 7. On the other hand, when the hinge pin 48 is moved toward the proximal end 52 of the housing portion 42, the mid-portions of the two longest flexible and resilient frame members 16 are permitted to separate from each other, and portions of the flexible and resilient frame members 16 are moved into the notches 58 in the housing portion 42.

The flexible and resilient frame members 16 can be made from flexible and resilient fiberglass such as used in fishing poles. In addition, graphite epoxy can be used make the flexible and resilient frame members 16. The handle assembly 12 can be made of metal, e.g. aluminum, or plastic materials. The hinge lock assemblies 20 can be made from metal tubing or stiff, rigid, plastic materials.

The components of the collapsible fishing net apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved collapsible fishing net apparatus that is low in cost, relatively simple in design and operation, and which may advantageously be used to provide frame elements which are not permanently curved or bent. With the invention, a collapsible fishing net apparatus provides that hinge elements between adjacent frame members are protected from impacts and other forces tending to damage the hinges. With the invention, a collapsible fishing net apparatus is provided which has a round net contour and which avoids the use of acutely-angled, sharp corners. With the invention, a collapsible fishing net apparatus is provided which avoids the use of springs in collapsible fishing net devices. With the invention, a collapsible fishing net apparatus is provided which includes frame elements that can form a naturally curved contour with the hinges therebetween protected and reinforced. With the invention, a collapsible fishing net apparatus provides that a portion of the collapsible frame members can be stored in a hollow handle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A collapsible fishing net apparatus, comprising:

a handle assembly which includes a frame-supporting hinge assembly, a frame assembly connected to said frame-supporting hinge assembly and supported by said handle assembly, said frame assembly including a plurality of flexible and resilient frame members, a plurality of hinge assemblies connected between adjacent flexible and resilient frame members, and a plurality of manually selectable hinge lock assemblies supported by said flexible and resilient frame members, and a net assembly supported by said flexible and resilient frame members of said frame assembly, wherein said hinge lock assemblies include rigid, hollow cylinders having an inner diameter greater than an outer diameter of said flexible and resilient frame members, wherein, of said flexible and resilient frame members of said frame assembly, two of said flexible and resilient frame members which are connected to said frame-supporting hinge assembly are longer than other flexible and resilient frame members, wherein said handle assembly includes a housing portion which defines a hollow interior chamber, wherein said handle assembly includes a first longitudinal slot located on a first side of said housing portion and includes a second longitudinal slot located on a second side of said housing portion which is opposite to said first side and said first longitudinal slot, wherein said frame-supporting hinge assembly includes a hinge pin adapted to be partially received in and slide in said first longitudinal slot and said second longitudinal slot, wherein said hinge pin is connected to proximal ends of two of said flexible and resilient frame members, such that when said hinge pin is moved toward a distal end of said housing portion, said two proximal ends of said flexible and resilient frame members are moved distally and partially into said hollow interior chamber and such that when said hinge pin is moved toward a proximal end of said housing portion, said two proximal ends of said flexible and resilient frame members are moved proximally and said two flexible and resilient frame members are moved partially out from said hollow interior chamber, wherein said housing portion further includes a pair of notches located at said proximal end, said notches adapted to receive the two ends of said flexible and resilient frame members connected to said hinge pin when said frame assembly is in an open orientation.

* * * * *